July 19, 1955     G. A. LYON     2,713,516
WHEEL COVER
Filed Nov. 10, 1952     3 Sheets-Sheet 1
Re.25144
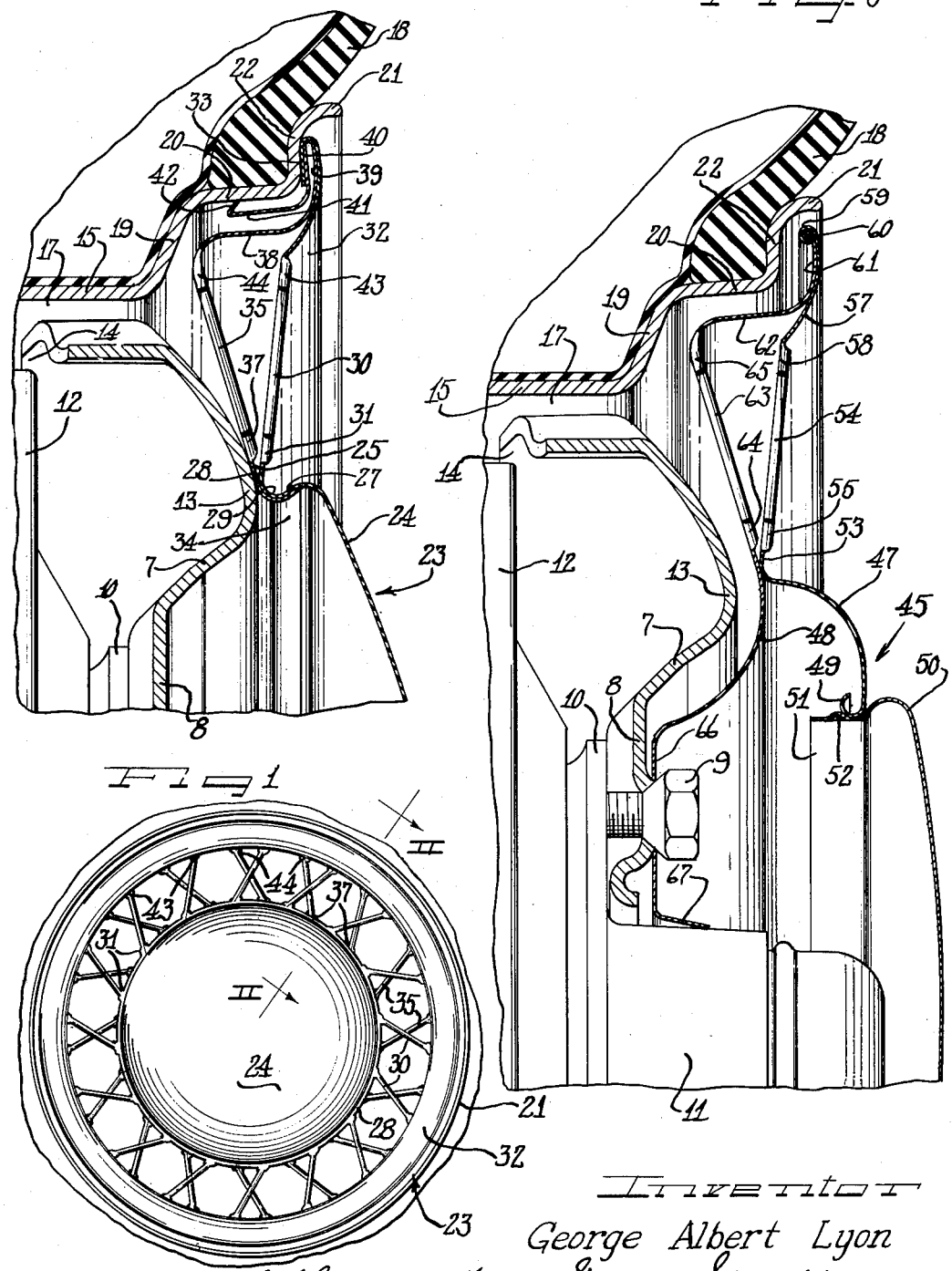
Inventor
George Albert Lyon
By Hill, Sherman, Meroni, Gross & Simpson
Attys July 19, 1955   G. A. LYON   2,713,516
WHEEL COVER
Filed Nov. 10, 1952   3 Sheets-Sheet 2
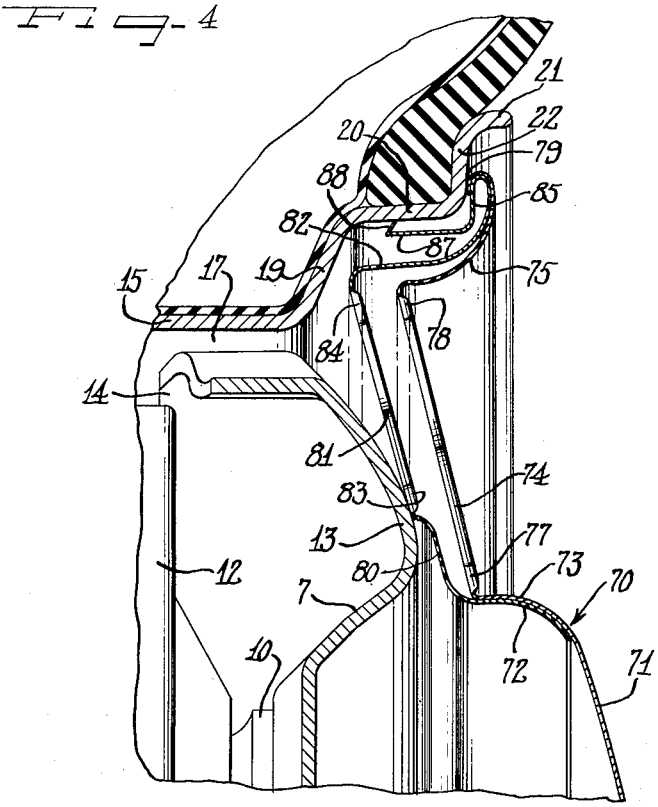
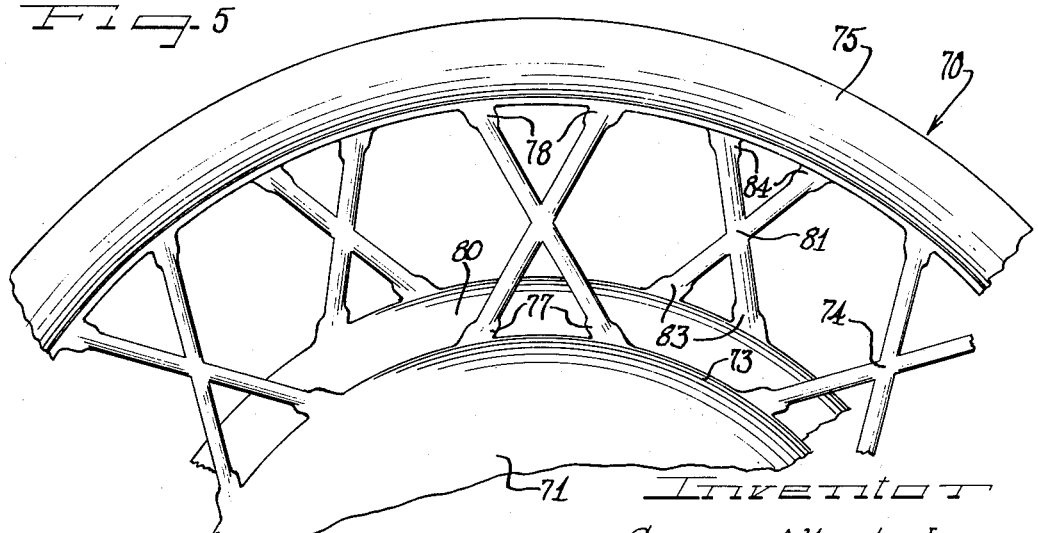
Inventor
George Albert Lyon
by Hill, Sherman, Meroni, Gross & Simpson
Attys July 19, 1955

G. A. LYON 2,713,516

WHEEL COVER

Filed Nov. 10, 1952

Inventor
George Albert Lyon
By Hill, Sherman, Meroni, Gross & Simpson
Attys

United States Patent Office 2,713,516
Patented July 19, 1955

2,713,516

WHEEL COVER

George Albert Lyon, Detroit, Mich.

Application November 10, 1952, Serial No. 319,637

22 Claims. (Cl. 301—37)

The present invention relates to improvements in wheel structures and more particularly concerns the ornamental and protective covering of the outer side of vehicle wheels.

An important object of the present invention is to provide a vehicle wheel of a non-wire-spoke type having on the outer side thereof means affording the appearance of the wheel being a wire-spoke type of wheel.

Another object of the invention is to provide a cover for disposition at the outer side of a vehicle wheel of non-wire-spoke type and affording simulation of a wire-spoke wheel structure.

Still another object of the invention is to provide a wire wheel simulating wheel cover of simple and economical construction.

A still further object is to provide improvements in vehicle wheel covers generally.

Other objects, features and advantages of the present invention will be readily apparent from the following detailed description of certain preferred embodiments thereof taken in conjunction with the accompanying drawings in which:

Figure 1 is a side elevational view of a vehicle wheel structure embodying features of the invention;

Figure 2 is an enlarged fragmentary radial sectional view taken substantially on the line II—II of Figure 1;

Figure 3 is a radial sectional view similar to Figure 2 but showing a modified form of the wheel cover;

Figure 4 is a radial sectional view similar to Figures 2 and 3 but showing a further modification of the cover;

Figure 5 is a fragmentary outer side elevational view of the wheel cover of Figure 4;

Figures 6, 7:
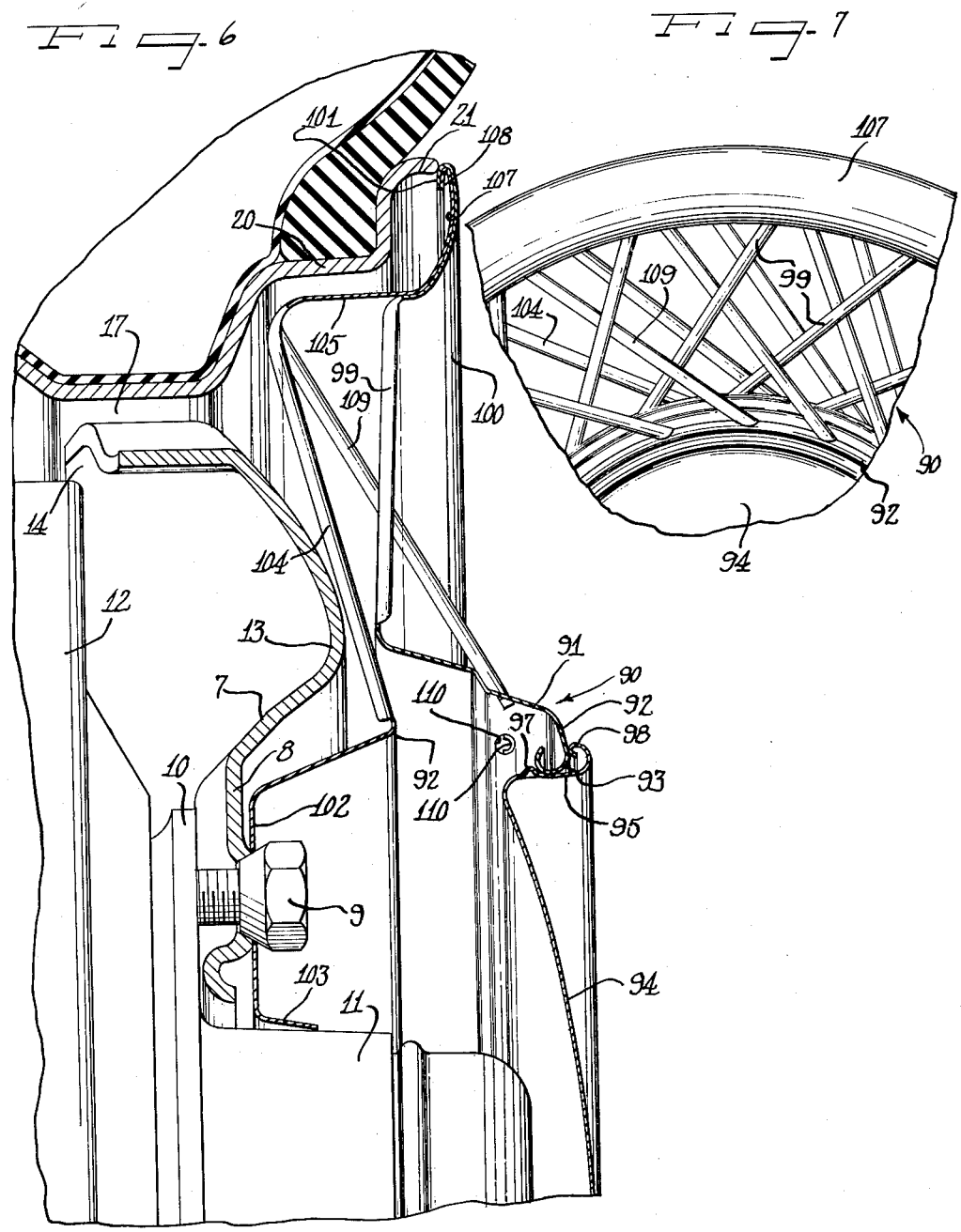
Figure 6 is a radial sectional view similar to Figure 3 but showing still another modification.
Figure 7 is a fragmentary front face elevational view of the cover of Figure 6.

A wheel with which the present invention may be used may be of the disk spider type comprising a disk spider body 7 (Figures 2, 3, 4 and 6) having a central dished and apertured bolt-on flange 8 adapted to be secured by bolts 9 to a flange member 10 on a vehicle axle hub 11 and carrying a brake drum 12. An intermediate axially outwardly projecting annular nose bulge 13 on the wheel body surrounds the bolt-on flange and terminates in a peripheral generally axially rearwardly extending marginal attachment flange 14 which is secured in suitable manner to a base flange 15 of a multi-flanged tire rim. At suitable intervals such as four peripherally spaced intervals, the attachment flange 14 is inset to provide air circulation openings 17 through the wheel.

The tire rim is adapted to support a pneumatic tire and tube assembly 18. For this purpose, the tire rim includes an outer side flange 19 extending generally radially outwardly from the outer margin of the base flange 15 and merging with a generally axially and slightly radially outwardly sloping intermediate flange 20. The latter flange merges with a terminal flange 21 having a generally radially outwardly extending portion 22.

As shown in Figures 1 and 2, the outer side of the wheel has mounted thereon a protective and ornamental wheel cover 23 which is preferably constructed and arranged to afford for the outer side of the wheel general simulation of wire spoke structure appearing as though connecting the wheel body 7 with the tire rim. To this end, the cover 23 comprises a pair of cover plates 24 and 25 each of which is provided with simulated wire spoke structure similarly arranged but complementary to the companion spoke structure and coordinated in assembly to afford the visual effect from the outer side of the cover of two series of tire rim supporting, peripherally angled, crossing spokes extending between the wheel body and the tire rim.

The outer of the cover members 24 preferably comprises a disk of sheet material such as stainless steel or brass or other appropriate sheet material of a diameter to substantially cover the wheel body 7 and the tire rim. The central portion of the cover plate 24 is preferably in the form of a crowned hub-cap simulating circular shape of a diameter to overlie the central bolt-on flange portion 8 of the wheel body and with its periphery overlying the nose bulge 13 of the wheel body. At the periphery of the hub-cap crown portion of the cover member 24 is provided a generally axially and radially inwardly directed flange 27 merging with a generally radially outwardly and preferably slightly axially outwardly angled annular flange 28 and defining therewith a generally radially inwardly underturned reinforcing rib 29.

The flange 28 is narrow and lies opposite the peak of the nose bulge 13 of the wheel body and has extending generally radially and axially outwardly therefrom integrally in one piece therewith a uniform series of peripherally spaced and angled spoke elements 30. Each of the spoke elements 30 is preferably transversely contoured to present a rounded generally wire-spoke simulating outer face. While the spoke elements 30 may be inwardly hollow, they may, of course, be full round, as preferred. At their juncture with the flange 28, the spoke elements 30 are preferably provided with widened portions generally simulative of attachment bosses 31 on a wheel body. Material between the spokes is sheared away to provide substantial openings through the cover plate 24.

The spoke elements 30 extend outwardly over the radially outer portion of the wheel body 7 and beyond the juncture of the wheel body with the tire rim and in the present instance with their outer ends overlying the side flange 19 of the tire rim and merging integrally in one piece with an annular outer marginal portion 32 of the outer cover member 24. For rigidity the cover portion 32 is contoured angularly, as, for example, on a concave-convex formation and has an underturned marginal extremity flange 33 which in assembly with the wheel is adapted to lie against the terminal flange portion 22 of the tire rim.

Herein the inner cover member 25 not only cooperates with the outer cover member 24 to afford complementary spoke pattern but also provides means for attaching the cover to the wheel. To this end, the inner cover member 25 is in the form of a plate made from appropriate sheet material such as stainless steel or brass or other preferred material and may be constructed complementary as a full disk, or for lighter weight construction and economy as an annular plate disposed in interconnected relation with the spoke-carrying portion of the outer cover member 24. A flange or sleeve portion 34 of the inner cover member is secured in internested retaining complementary engagement with the inner side of the rib 29 of the outer cover member. From the inner portion of the inner cover member 25 extends a series of individual spoke elements 35 formed integrally in one piece therewith, angling peripherally in crossing relation to the spoke elements 30 and preferably directed generally radially outwardly and axially inwardly in diverging relation to the adjacent inner ends of the spoke elements 30. At their inner end junctures, the spoke elements 35 are preferably formed with lateral boss-like enlargements 37 simulating attachment bosses of a wheel body.

The spoke elements 35 extend preferably to approximately the same distance radially outwardly as the spoke elements 30 and in assembly with the wheel have their outer ends adjacent to but spaced from the side flange 19 of the tire rim and merging integrally in one piece with a generally axially outwardly extending flange portion 38 of the inner cover member. The flange portion 38 is of smaller diameter than the intermediate flange 20 of the tire rim so as to afford a substantial annular space therebetween, and merges with a generally radially outwardly extending flange portion 39 generally complementary to and nested behind the marginal portion 32 of the outer cover member. An underturned generally radially inwardly extending flange portion 40 extends from the flange portion 39 and is retainingly engaged by the underturned flange 33 of the outer cover member for holding the cover members assembled at the outer margin of the cover.

For retaining the cover on the wheel, the underturned flange 40 is equipped with generally axially inwardly extending and radially flexible retaining fingers 41 extending into the gap between the intermediate flange 20 and the cover flange 38 and having short and stiff retaining terminals 42 angled generally radially and axially outwardly and gripping the intermediate flange 20 in retaining relation. The arrangement is such that the cover can be applied to the wheel by generally centering the same relative to the wheel and pressing the same axially inwardly so that the retaining terminals 42, which normally extend to a greater diameter than the intermediate flange 20, will retainingly grip the retaining flange under substantial tension of the fingers 41. Removal of the cover is easily effected by applying a pry-off tool to the multi-layer reinforcing outer marginal bead afforded by the internested outer marginal portions of the two cover members and prying the cover free by leverage against the terminal flange 21.

It will be understood that the spoke elements 35 may be structurally similar to the spoke elements 30, that is of outwardly rounded shape generally simulative of a wire spoke structure for a wheel, and they may be either hollow inwardly or full round as preferred. The spoke elements 30 may be provided with attachment boss simulating outer end enlargements 43 while the spoke elements 35 may be provided with similar attachment boss simulating enlargements 44 at their outer ends to afford the illusion of attachment of the spokes to the tire rim. Any preferred finish may be afforded the outer side of the outer cover member 24 and the spokes 30 and 35.

In the assembly of the cover members 24 and 25, the spoke elements 30 and 35 are preferably disposed in crossing relation as appears in Figure 1. It will be understood, of course, that as many or as few of the spoke elements 30 and 35 may be provided as desired.

In assemby with the wheel the inner portion of the inner cover member 25 preferably bears against the nose bulge 13 of the wheel body and thereby closes the hub chamber defined between the wheel body and the crown portion of the cover from entry of dirt from the outside. However, the substantial spaces between the spokes in the annular intermediate area of the cover lying opposite the wheel openings 17 enable free circulation of air through the cover and through the wheel openings 17 for brake drum cooling purposes.

In the modification of Figure 3, a cover 45 is provided that is adapted for attachment to the wheel by means of the attachment bolts 9. To this end, an outer cover member 47 is supported by an inner cover member 48. The outer cover member 47 is in the form of an annulus having an apertured central portion provided with an inner marginal underturned reinforcing bead 49 arranged to receive and retain a central hub cap closure 50 provided with an axially inwardly directed attachment flange 51 having radially outwardly directed retaining bumps 52 engageable in snap-on pry-off relation behind the bead 49 to retain the hub cap shouldered against the outer side of the inner margin of the cover member 47 in snap-on pry-off relation. It will be observed that the size of the opening in the cover member 47 is large enough to enable access to the attachment bolts 9.

The inner portion of the cover member 47 extends generally axially inwardly toward the nose bulge 13 of the wheel body and has a generally radially outwardly extending flange 53 from which angle generally peripherally and radially outwardly and axially outwardly a series of spoke elements 54 integral in one piece with the flange. At their juncture with the flange 53 the spoke elements 54 may be provided with attachment boss enlargements 55. At their outer ends the spoke elements 54 merge integrally in one piece with an annular outer marginal portion 57 of the cover member 47. At their outer end junctures the spoke elements 54 may be provided with attachment boss simulating enlargements 58.

For rigidity the outer cover portion 57 is preferably angularly contoured in cross-section, such, for example, as concave-convex and it extends into overlying relation to the tire rim terminal flange portion 22. At its outer margin the cover portion 57 is turned under to provide a reinforcing and finishing bead 59 which is retainingly engaged about a complementary outer marginal bead 60 of an outer annular cover portion 61 of the inner cover member 48 disposed in complementary nested relation at the inner side of the cover portion 57.

Extending generally axially inwardly from the cover portion 57, the outer portion of the cover member 48 has a flange 62 that is spaced radially inwardly from the intermediate flange 20 of the tire rim and merges at its axially inner margin with a series of spoke elements 63 having their outer ends adjacent to the side flange 19 of the tire rim and angling generally radially inwardly and axially inwardly and peripherally behind the spoke elements 54 toward juncture integrally in one piece with the inner portion of the cover member 48 which lies opposite the wheel bulge 13. It will be observed that the flange portion 53 of the outer cover member preferably engages against the inner cover member 48 adjacent juncture of the spoke elements 63 with the cover member. At their inner ends the spoke elements 63 have attachment boss simulating enlargements 64 while at their outer ends these spoke elements have attachment boss simulating enlargements 65.

The inner cover member 48 is preferably dished generally complementary to the attachment flange portion of the wheel body and has an attachment flange 66 which is adapted to be engaged by the attachment bolts 9 for attaching the cover to the wheel at the bolt-on flange 8. An inner marginal portion 67 of the inner cover member may engage in centering relation with the wheel hub 11.

It will be observed that the spoke elements 54 and 63 while they lie in axially spaced relation similarly as the spoke elements 30 and 35 are relatively disposed, and also in diverging relation from the central portion of the cover assembly, are spaced axially outwardly from the nose bulge 13 at their inner ends. However, the engagement of the cover members 47 and 48 adjacent the inner ends of the spoke elements, and the engagement of the bolt-on flange 66 of the cover with the bolt-on flange of the wheel substantially closes the hub chamber provided by the cover against entry of dirt into the chamber.

The spoke elements 54 and 63 may be constructed as rearwardly hollow, outwardly rounded elements in cross section or they may be formed as hollow tubular fully or substantially closed structures. In any event the spoke elements 54 and 63 are preferably disposed in crossing relation peripherally considered and afford the appearance of a wheel body supporting a tire rim. The substantial openings in the intermediate spoke portion of the cover, lying opposite the wheel openings 17 affords free ventilation through the cover and the wheel.

In the modification of Figs. 4 and 5, a cover 70 is provided which may in general be similar to the cover 23 except that spoke elements are provided of generally X-shape rather than individual spoke elements. In the arrangement shown, an outer cover member 71 comprising a disk substantailly covering the outer side of the wheel body 7 and the tire rim is disposed in nested supported relation to an inner cover member 72. To this end the outer cover member 71 provides a central crown, hub cap simulating portion having a peripheral generally axially inwardly extending flange 73 which is in complementary nested relation to the inner sleeve-like portion of the inner cover member 72 and has extending generally radially outwardly and axially inwardly therefrom a uniform series of generally X-shaped spoke members or elements 74 each of which has a pair of legs attached integrally in one piece with the flange 73 and a pair of diverging legs attached integrally in one piece with an outer annular cover portion 75. Each of the spoke members 74 has the legs disposed in integral one-piece relationship with spaces between the respective inner and outer leg portions of the spoke elements and with the area between the spoke elements 74 cut away to provide substantial free spaces. At their inner legs the spoke elements are preferably provided with juncture boss enlargements 77 while the outer ends of the outer legs at juncture with the cover portion 75 are provided with attachment boss simulating enlargements 78. The outer annular cover portion 75 is preferably of substantially rigid angular cross sections such as concave convex and has an underturned reinforcing and finishing bead flange 79.

Inner cover member 72 not only provides a series of spoke elements generally complementary to and cooperatively related to the spoke elements 74 of the outer cover member 71, but also provides means for attaching the cover to the wheel. To this end, the inner cover member 72 from its attachment nested engagement with the inner cover member 71 extends generally radially outwardly and axially inwardly to provide a flange 80 which underlies the inner legs of the spoke elements 74 and has extending therefrom X-shaped spoke elements 81 which are preferably shorter than the spoke elements 74 and are disposed, as best seen in Fig. 5, centered behind or axially spaced inwardly from the series of spoke elements 74 but exposed symmetrically in the spaces between the spoke elements 74. The spoke elements 81 extend preferably radially outwardly and axially inwardly and have the outer ends of the outer legs thereof integrally joined to a generally axially outwardly extending annular flange 82. The X-shaped spoke elements 81 have at their inner juncture ends attachment boss simulating enlargements 83 while at their outer ends they have attachment boss simulating enlargements 84.

The outer flange member 82 extends at its outer margin generally radially outwardly in nested interengagement with the inner side of the outer portion 75 of the outer cover member, and an underturned marginal flange 85 is engaged in retaining assembled relation by the underturned bead flange 79. The flange 85 extends radially inwardly to clear the juncture between the intermediate flange 20 and the terminal flange portion 22 and has extending generally axially inwardly therefrom retaining resilient spring fingers 87 having axially and radially outwardly angled short and stiff retaining terminals 88 grippingly engaging the inner side of the intermediate flange 20 for retaining the cover on the wheel similarly as explained in connection with the retaining fingers 41 and their retaining terminals 42 of the cover 23.

The cover 70 thus provides a substantially rigid cover structure which is adapted to be applied by pressing the same axially inwardly onto the wheel and which may be pried free from the wheel by inserting a pry-off tool between the outer beaded peripheral multi-flange structure of the cover and the terminal flange of the tire rim. By having the outer marginal portion of the flange 80 of the inner cover member engaging against the nose bulge 13 of the wheel body the hub chamber inside the cover is substantially closed against entry of dirt. Free air circulation through the substantial spaces between the spokes of the cover and through the wheel openings 17 is permitted.

The modification of Figures 6 and 7 is somewhat like that of Figure 3 except that the cover 90 is provided with three series of spokes in which one of the series of spokes is provided integral with an outer cover plate 91 while both of the remaining series of spokes are provided on an inner cover plate 92.

The outer cover plate 91 is formed with an annular inner portion 92 of angular cross section having a central aperture defined by an inwardly curled reinforcing and finishing bead 93. The opening thus provided is of sufficient size to gain free access to the cover retaining bolts 9. For closing the central opening, a hub cap 94 is provided having an axial flange 95 dimensioned to fit within the diameter of the bead 93 and having retaining bumps 97 at spaced intervals to engage in snap-on pry-off relation with the bead 93, a turned outer marginal underturned flange 98 bearing against the outer side of the cover portion 92.

The inner cover portion 92 angles generally radially outwardly and axially inwardly and has an intermediate and generally radially outwardly extending and preferably slightly axially outwardly directed intermediate portion formed into a series of uniformly spaced spokes 99 formed in one piece therewith and directed angularly peripherally toward the right as viewed in Figure 7. At their inner ends, the spokes are connected integrally to the inner cover portion 92, while at their outer ends, the spokes are connected integrally to an annular generally convex-concave outer portion 100 on which is preferably of an extent to overlie the tire rim terminal flange 21 and has an underturned flange 101 for reinforcement and finishing and preferably adapted to lie against the edge of the terminal flange 21.

The inner plate 92 is preferably provided with a central depressed bolt-on flange 102 engageable by the attachment bolts 9 for securing the flange 102 to the bolt-on flange 8 of the wheel body. A central centering flange 103 is adapted to engage the hub 11.

The inner portion of the cover member 92 is connected integrally in one piece by means of spokes 104 with an outer annular cover portion 105. This annular portion extends generally axially and on a diameter less than the diameter of the intermediate flange 20 of the tire rim and merges with an outer concave-convex portion 107 extending generally radially outwardly and nested within the outer cover portion 100 and having an underturned marginal rigidifying flange 108 which is nested within and thereby secured in position with relation to the outer cover plate by the underturned flange 101. In addition to the spokes 104, the inner cover plate 92 has extending integrally in one piece from the outer cover portion 105 and alternating with the spokes 104, a series of spokes 109 which, in assembly, extend through the spaces between the spokes 99 and have end lugs 110 which are assembled within apertures 111 in the side of the cover member 92 adjacent to the outer portion of the inner cover member. It will be observed from Figure 7 that the spokes 104 and 109 are angled in crossing relation to the spokes 99. The spokes 99 and 109 connect the cover portion 92 rigidly to the cover portions 101 and 105, while the spokes 104 provide a flexible connection of the inner bolt-on flange portion 102 of the cover with respect to the outer cover portion 105 so that when the cover is applied to the wheel and the bolts 9 are tightened, the inner cover plate will flex at the joints with the spokes 104 to hold the cover under tension against the tire rim at the underturned flange 101.

It will be observed that the spoke elements 99, 104 and 109 are spaced apart substantially in each respective series of spokes. The spoke elements are individually of rounded stiff section which may be either partially closed or wholly closed, that is, semi-cylindrical or cylindrical or some variant intermediate cylindrical and semi-cylindrical.

It will also be observed that the spokes provide substantial space therebetween through which the inner portions of the several spokes are visible and especially the rear spokes 104 are visible between and through the outer series of spokes, and substantial air circulation opening is provided through the cover for circulation of air through the cover and the wheel openings 17.

It will be understood that modifications and variations may be effected without departing from the scope of the novel concepts of the present invention.

I claim as my invention:

1. In a wheel structure including a tire rim and a wheel body, a cover for the outer side of the wheel comprising a pair of separately formed cover members comprising an axially outer cover member and an axially inner cover member, the outer cover member being supported by the inner cover member, said inner cover member having means engageable with one of the wheel members for attachment of the cover to the wheel, both of said cover members having intermediate axially opposite portions thereof provided with spoke elements with the spoke elements of the inner cover member disposed behind the spoke elements of the outer cover member and visible through openings between the spoke elements of the outer cover member.

2. In a wheel structure including a tire rim and a wheel body, a cover for the outer side of the wheel comprising a pair of cover members comprising an axially outer cover member and an axially inner cover member, the outer cover member being supported by the inner cover member, said inner cover member having means engageable with one of the wheel members for attachment of the cover to the wheel, both of said cover members having intermediate axially opposite portions thereof provided with spoke elements with the spoke elements of the inner cover member disposed behind the spoke elements of the outer cover member and visible through openings between the spoke elements of the outer cover member, the retaining means on the inner cover member comprising retaining spring fingers formed separately thereon from said spoke elements.

3. In a wheel structure including a tire rim and a wheel body, a cover for the outer side of the wheel comprising a pair of cover members comprising an outer cover member, an inner cover member, the outer cover member being supported by the inner cover member, said inner cover member having means engageable with one of the wheel members for attachment of the cover to the wheel, both of said cover members having intermediate opposite portions thereof provided with spoke elements with the spoke elements of the inner cover member disposed behind the spoke elements of the outer cover member and visible through openings between the spoke elements of the outer cover member, the retaining means on the inner cover member comprising a bolt-on flange engaging the wheel body member.

4. In a cover for disposition at the outer side of a vehicle wheel, an axially outer cover member having a radially inner portion and a radially outer portion spaced radially apart and integrally joined in one piece by a series of spoke-like elements, and an axially inner cover member having a radially inner portion and a radially outer portion spaced apart and joined by integral spoke-like elements, said cover members having portions thereof joined together with the spoke elements of the inner cover member disposed behind and visible through spaces between the outer cover member spoke elements.

5. In a cover for disposition at the outer side of a vehicle wheel comprising, in combination, a pair of separately formed plates one of which is disposed at the axially inner side of the other of said plates, said plates being joined together, each of said plates having an intermediate area thereof stamped to provide spoke simulating structure, the outer cover plate having substantial spaces between the spoke structure so that the spoke structure of the inner cover plate is visible through the spaces.

6. In a cover structure for disposition at the outer side of a vehicle wheel, axially inner and axially outer cover plates secured together at their outer margins, the cover plates having intermediate spoke simulating annular areas spaced axially apart, the spoke simulating area of the outer cover plate having substantial spaces through which the spoke simulating area of the inner cover plate is visible.

7. In a cover structure for disposition at the outer side of a vehicle wheel, axially inner and outer cover plates secured together at their outer margins, the cover plates having intermediate spoke simulating annular areas spaced axially apart, the spoke simulating area of the outer cover plate having substantial spaces through which the spoke simulating area of the inner cover plate is visible, said cover plates also having radially inner portions thereof secured together and the axially inner of said cover plates having at its outer margin cover retaining structure engageable with a vehicle wheel for retaining the cover in place on a wheel to which it may be applied.

8. In a cover for disposition at the outer side of a vehicle wheel, an axially outer cover plate, an axially inner cover plate, the outer margins of said cover plates being interconnected and provided with a series of generally axially inward extending retaining fingers for retaining engagement with a tire rim, said cover plates having opposed annular areas provided with spoke structure affording the appearance from the outer side of the cover of a wheel body supporting a rim portion through the medium of spokes therebetween.

9. In a cover for disposition at the outer side of a vehicle wheel, a cover member having a radially inner portion from which are directed integrally in one piece generally radially outwardly extending spoke elements joined at their outer ends to a radially outer integral annular cover portion in one piece therewith, an axially inner cover member having inner and outer radially spaced portions joined integrally in one piece by means of spoke elements, the radially outer portions of each of said cover members being secured together.

10. In a cover for disposition at the outer side of a vehicle wheel, a cover member having a radially inner portion from which are directed integrally in one piece generally radially outwardly extending spoke elements joined at their outer ends to a radially outer integral annular cover portion in one place therewith, an axially inner cover member having radially inner and outer radially spaced portions joined integrally in one piece by means of spoke elements, said cover members being connected together with the spoke elements in complementary relation.

11. In a cover for disposition at the outer side of a vehicle wheel, a pair of axially inner and outer coaxially arranged cover plates, each of said cover plates having stamped therein an annular series of spoke elements, the spoke elements being disposed in axially opposed relation and with the spoke elements of one of the plates angled in one peripheral direction and the spoke elements of the other of the plates angled in the opposite peripheral direction and disposed in crossing relation with the spoke elements of one of the plates behind the spoke elements of the other of said plates.

12. In a cover for disposition at the outer side of a vehicle wheel, a pair of cover plates interengaged in axially opposed concentric relation, each of said cover plates having an annular area stamped to provide spoke elements integrally connecting radially inner and radially outer portions of the respective cover plate and with the annular spoke intermediate areas disposed in opposing relation, the spoke elements of the inner plate being of generally X-shape and with the spoke elements of the inner plate disposed intermediate the spoke elements of the outer plate.

13. In a wheel structure including a tire rim and a wheel body, the tire rim and wheel body having at juncture thereof wheel openings, a cover for the outer side of the wheel comprising a pair of axially opposed cover plates having radially inner portions in engagement and radially outer portions in engagement, the respective radially inner and radially outer portions of the plates having integrally in one piece connecting spoke elements providing a spoke pattern opposite the wheel openings for circulation of air through the wheel and the cover, the inner of said plates having means for attachment to the wheel and engaging the wheel body to close off against entry of dirt a hub chamber defined by the cover and the wheel body.

14. In a wheel structure including a tire rim and a wheel body, the tire rim and wheel body having at juncture thereof wheel openings, a cover for the outer side of the wheel comprising a pair of cover plates having radially inner portions in engagement and radially outer portions in engagement, the respective radially inner and radially outer portions of the plates having integrally in one piece connecting spoke elements providing a spoke pattern opposite the wheel openings for circulation of air through the wheel and the cover, the inner of said plates having means for attachment to the wheel and engaging the wheel body to close off against entry of dirt a hub chamber defined by the cover and the wheel body, said attachment means comprising a bolt-on flange on the inner of said cover plates and the outer of said cover plates having a central opening carrying a hub cap in snap-on pry-off relation for closing the opening.

15. In a cover for disposition at the outer side of a vehicle wheel, an outer cover plate and an inner cover plate, said cover plates having annular radially outer portions internested and interlocked to connect the plates together, the outer cover plate having a circular portion spaced radially inwardly from the radially outer annular portion thereof, a series of generally radially outwardly and peripherally angled spokes connecting said inner and outer portions of the outer cover member integrally in one piece, said inner cover member having an inner circular portion, a series of spoke members connecting said inner cover portion of the inner cover member with the outer annular portion of the inner cover member integrally in one piece, and a third series of spokes integrally connected at their outer ends to said outer portion of the inner cover member and angled through the spokes of the outer cover member and having the distal ends thereof connected to said inner portion of the outer cover member.

16. As an article of manufacture, an ornamental wheel cover for disposition over the hub and rim of a wheel comprising a front section of relatively thin sheet material formed with a dome-like central portion with spoke-like elements emanating therefrom and terminating in a first annulus adapted to be disposed over the rim of the wheel, and a rear section coaxially disposed with respect to the front section and being attached thereto, the rear section having spoke-like elements emanating therefrom and terminating in a second annulus nested in said first annulus, said second annulus having a plurality of spring fingers adapted to make a biting engagement with the rim of the wheel when the wheel cover is pressed thereon.

17. In a wheel assembly including a wheel having a hub portion and a drop center rim, an ornamental wheel cover disposed over the wheel and a substantial portion of the side flanges of the rim comprising a pair of coaxial sections joined together, the forward section having a central portion for concealing the wheel hub portion, an annulus overlapping the side flanges of the rim so as to substantially conceal the latter, and a plurality of spoke-like elements joining said central portion and said annulus, the rear section having a sleeve and an annulus joined respectively to the central portion and annulus of the forward section, and a plurality of spoke-like elements joining said sleeve and second named annulus, and means for securing the wheel cover to a wheel.

18. As an article of manufacture, an ornamental wheel cover for disposition over the hub and rim of a wheel comprising a pair of coaxial sections joined together, the forward section having a central portion for concealing the wheel hub, an annulus for concealing part of the wheel rim and a plurality of spoke-like elements joining said central portion and said annulus, the rear section having a sleeve and an annulus joined respectively to the central portion and annulus of the forward section and a plurality of spoke-like elements joining said sleeve and second named annulus, and means for securing the wheel cover to a wheel.

19. As an article of manufacture, an ornamental wheel cover for disposition over the hub and rim of a wheel comprising a front section of relatively thin sheet material formed with a dome-like central portion with spoke-like elements emanating therefrom and terminating in a first annulus adapted to be disposed over the rim of said wheel, and a rear section coaxially disposed with respect to the front section and being attached thereto, the rear section having spoke-like elements emanating therefrom and terminating in a second annulus nested in said first annulus, the points of emanation of the first and second named spoke-like elements being axially spaced.

20. As an article of manufacture, an ornamental wheel cover for disposition over the hub and rim of a wheel comprising a front section of relatively thin sheet material formed with a dome-like central portion with spoke-like elements emanating therefrom and terminating in a first annulus adapted to be disposed over the rim of the wheel, and a rear section coaxially disposed with respect to the front section and being attached thereto, the rear section having spoke-like elements emanating therefrom and terminating in a second annulus nested in said first annulus, said first and second named spoke-like elements being inclined in clockwise and counterclockwise directions.

21. As an article of manufacture, an ornamental wheel cover for disposition over the hub and rim of a wheel comprising a front section of relatively thin sheet material formed with a dome-like central portion with spoke-like elements emanating therefrom and terminating in a first annulus adapted to be disposed over the rim of the wheel, and a rear section coaxially disposed with respect to the front section and being attached thereto, the rear section having spoke-like elements emanating therefrom and terminating in a second annulus nested in said first annulus, said first and second named spoke-like elements being inclined in opposite radial directions and being spaced axially at their points of emanation.

22. As an article of manufacture, an ornamental wheel cover for disposition over the hub and rim of a wheel comprising a front section of relatively thin sheet material formed with a dome-like central portion with spoke-like elements emanating therefrom and terminating in a first annulus adapted to be disposed over the rim of the wheel, and a rear section coaxially disposed with respect to the front section and being attached thereto, the rear section having spoke-like elements emanating therefrom and terminating in a second annulus nested in said first annulus, said spoke-like elements being formed from the sheet material so as to have a U-shaped cross section with the open end of the section being directed rearwardly.

References Cited in the file of this patent

UNITED STATES PATENTS

| | | |
|---|---|---|
| D. 167,802 | McLeod | Sept. 23, 1952 |
| 2,509,360 | Marshall | May 30, 1950 |
| 2,600,410 | Lyon | June 17, 1952 |
| 2,600,412 | Lyon | June 17, 1952 |
| 2,601,209 | Lyon | June 17, 1952 |
| 2,602,705 | Lyon | July 8, 1952 |